Patented Feb. 3, 1953

2,627,467

UNITED STATES PATENT OFFICE 2,627,467

SOYA-BEAN OIL AND METHOD OF PRODUCING THE SAME

Chester M. Gooding, Staten Island, N. Y., assignor to The Best Foods, Inc., New York, N. Y., a corporation of New Jersey No Drawing. Application March 16, 1951, Serial No. 216,099

14 Claims. (Cl. 99—144)

1

This invention relates to soya bean oil and more particularly to hydrogenated and winterized soya bean oil for salad oil, such as that used in mayonnaise.

Mayonnaise with good flavor stability does not possess sufficient freeze resistance to overcome some of the handling by the housewife. Mayonnaise can usually withstand ordinary refrigeration temperatures of about 50° F. However, on those occasions when the housewife lowers the temperature of the refrigerator for making frozen desserts, for example, oil emulsion failure occurs with ensuing oil separation of mayonnaise stored under such conditions. To overcome this defect, corn oil has been used as a substitute for cottonseed or other salad oil in mayonnaise, but aside from the limited available supply of corn oil, the corn oil does not possess the desired degree of flavor stability to warrant its extensive use for this purpose, especially during grocery shelf storage at summer temperatures. Refined soya bean oil is sometimes used as a means of avoiding emulsion failure, but such soya bean oil has only limited value in this respect and reverts in flavor to render substantially impossible its use in quality mayonnaise.

In accordance with this invention, a hydrogenated and winterized soya bean oil is provided which when used as the oil component of the mayonnaise produces a mayonnaise which has a marked freeze resistance and does not manifest the flavor reversion invariably encountered with the use of refined soya bean oil for this purpose. Mayonnaise prepared with the soya bean oil of this invention has a markedly superior freeze resistance and a superior flavor stability to that prepared from corn oil.

The hydrogenated and winterized soya bean oil of this invention has an iodine value of 100 to 120 and preferably of 110 to 120. It contains less than 1% and preferably less than 0.8% of conjugated dienoic acid components; less than 0.02% and preferably less than 0.015% of conjugated trienoic acid components and less than 0.02% of tetraenoic acid components. Desirably the soya bean oil of this invention contains substantially no conjugated dienoic, trienoic and tetraenoic acid components.

Mayonnaise is produced from the soya bean salad oil of this invention by incorporating such soya bean oil either alone or with other vegetable oils with vinegar, eggs, salt and other ingredients in the manner ordinarily employed for this purpose (e. g., in accordance with standard for mayonnaise of the Federal Security Agency, Federal

2

Register, August 12, 1950, pp. 5227–5232). Preferably, however, incorporation of oxygen in the mayonnaise should be avoided by protecting the product during processing, for example, with nitrogen.

The soya bean oil of this invention is produced by hydrogenating a refined soya bean oil to an iodine value of 100 to 120 and preferably 110 to 120 at a temperature less than 245° F., preferably less than 225° F. and desirably 195° F. to 220° F. After the hydrogenation the resulting hydrogenated oil is cooled. The solid components in the oil are then separated from the oil by any suitable means, such as filtration or centrifugation.

The soya bean oils of this invention are characterized by a relatively low content of iso-acids, relatively low viscosity, extended cold test values and excellent flavor stability over relatively long periods of time. The relatively low content of iso-acids in such oils is shown inter alia by their resistance to crystallization when chilled and the small amounts or substantial absence of conjugated dienoic, trienoic and tetraenoic acid components in such oils. The relatively low viscosity of the soya bean oils of this invention is shown by the following comparison of the viscosity of a sample of oil of this invention with that of a hydrogenated soya bean oil having approximately the same iodine value which was chilled and treated in the substantially same manner as the oil of this invention except that the hydrogenation of the oil of this invention was conducted at 216° to 222° F. at 40 pounds pressure as contrasted with a hydrogenation temperature of 330° to 350° F. at 20 pounds pressure and that the oil of this invention contained no conjugated dienoic and tetraenoic acid components and 0.004% of conjugated tetraenoic acid components, while the other hydrogenated oil contained 1.6% of conjugated dienoic acid components, 0.02% of conjugated trienoic acid components and 0.003% of conjugated tetraenoic acid components:

|  | Unhydrogenated Starting Soya Bean Oil | Soya Bean Oil of this Invention | Soya Bean Oil Hydrogenated at 330°–350° F. |
|---|---|---|---|
| Iodine value | 132.4 | 117.3 | 117.1 |
| Viscosity at 55° F. | 80.7 | 91.4 | 96.0 |

The extended cold test values of the soya bean oils of this invention are illustrated by a comparison of the period of time to the cloud point at 32° F. of the oils, the viscosity of which has just been described. Whereas the oil of this invention required 5 hours to reach the cloud point, the other hydrogenated soya bean oil became cloudy in 1½ hours. As contrasted with other known soya bean oils which manifest flavor deterioration in a relatively short period of time, the soya bean oils of this invention when incorporated in mayonnaise, for example, have 2 to 3 times the shelf life of mayonnaise made with the original refined soya bean oil.

The temperature at which the soya bean oils of this invention is produced should not exceed 245° F. Generally, the lower the temperature of hydrogenation below 245° F., the lower are the amounts of conjugated dienoic, trienoic and tetraenoic acid components, and the more adaptable is the resulting oil for salad purposes, such as a component in mayonnaise. Any hydrogenation catalyst which is effective for hydrogenation at temperatures at 245° F. or below is satisfactory for producing the soya bean oil of this invention. A nickel catalyst, such as that sold under the name of Rufert's catalyst and described in U. S. Patent 2,424,811 (July 29, 1947) if activated at 250° F. may be used in the customary amount (about 0.1% nickel on the amount of the oil hydrogenated) for hydrogenation conducted down to 210° F. The nickel copper catalyst described in U. S. Patent 2,320,063 granted on May 25, 1943 to The Best Foods, Inc., as assignee of C. J. Borkowski and J. L. Schille may be used if hydrogenation is conducted at temperatures of 185° F. to 245° F. with optimum results obtained at 195° to 220° F. Generally, the higher the pressure, the greater is the rate of hydrogenation. Pressures of 40 to 50 p. s. i. have been found satisfactory although higher pressures, such as 100 p. s. i. may be used to advantage.

The hydrogenation of the refined soya bean oil is conducted at a temperature of less than 245° F. until an iodine value of 100 to 120 and preferably 110 to 120 is obtained and that the resulting hydrogenated oil contains less than 1% and preferably less than 0.8% of conjugated dienoic acid components, less than 0.02% and preferably less than 0.015% of conjugated trienoic acid components and less than 0.02% of conjugated tetraenoic acid components. The amounts of conjugated components in the hydrogenated oil are determined by the method according to B. A. Brice et al. in Oil and Soap XXII, 219 (1945).

After hydrogenation the oil is cooled and the solid components in the oil are separated by filtration, centrifugation, decantation or other suitable means. It is desirable to use different conditions of crystallization, depending upon the degree of hydrogenation to which the oil is subjected. For example, when an oil is hydrogenated to an iodine value of 100, the crystallization temperature may be relatively high, such as 60° to 65° F. and preferably the oil is cooled relatively slowly, such as over a period of 2 to 3 days, whereas when hydrogenation to an iodine value of 120 is desired, the crystallization temperature may be as low as 40° F. or lower and the rate of cooling relatively rapid, such as 18 to 48 hours. A crystallization temperature of 40° to 55° F. and preferably 43° to 47° F. has been found satisfactory for oils hydrogenated to an iodine value of 110 to 115. It has also been found desirable to permit the oil to remain at the temperature to which it is cooled for a period of one day or longer. The temperature to which the oil is cooled is maintained during the separation of the solid components of the oil therefrom.

The soya bean oils of this invention may be improved for certain purposes by incorporating in them a monoester of citric acid as described in U. S. Patents 2,485,631 and 2,485,633 granted on October 25, 1949 to The Best Foods, Inc., as assignee of H. W. Vahlteich, C. M. Gooding and R. H. Neal A more comprehensive understanding of this invention is obtained by reference to the following examples:

EXAMPLE 1

Twenty-one thousand pounds of soya bean oil of 136.2 iodine value was hydrogenated at 220°–225° F. and at 25 pounds pressure to an iodine value of 105.3 using a nickel catalyst sold under the name of Rufert's catalyst and described in U. S. Patent 2,424,811. The hydrogenated oil was filtered to remove catalyst and was transferred to a tank fitted with cooling coils. The temperature was gradually lowered from 92° F. over a period of 40 hours to a low point of 61.5° F. At the end of 72 hours the crystallized portion was separated from the chilled oil by filtration under air pressure. The filtered oil was then deodorized at 440° F. There was obtained about 16,700 pounds of oil of iodine value of 106.0, which in the standard cold test gave a value of 1 hour.

The titer point of the filtrate was 26.6° C. and that of the filter cake was 35.9° C. The filtrate contained no conjugated dienoic acid components, 0.009% of conjugated trienoic acid components and a trace of conjugated tetraenoic acid components. The total dienoic, trienoic and tetraenoic acid components, whether conjugated or non-conjugated, were respectively 28.0%, 1.9% and a trace. The crystallized material collected in the form of a filter cake was found to have a melting point of 106.9° F. and an iodine value of 94.4.

The antiflavor reversion characteristics of the soya bean oil of this example and the other examples is improved by incorporating in it monoisopropyl citrate immediately after deodorization and before exposure to the atmosphere. The monoisopropyl citrate is added to the oil as a solution in the monoglycerides of the fatty acids derived from the soya bean oil of the example as described in Example 2 of U. S. Patent 2,485,631. An effective amount of monoisopropyl citrate added to the oil is 0.062 to 0.005% of the monoester by weight of the oil.

Mayonnaise was prepared from the foregoing oil in the usual manner and also, mayonnaise was made from a mixture of this oil with an equal part by weight of cottonseed salad oil having a cold test of 15½ hours. The finished mayonnaise products were normal in all respects and had resistance to emulsion failure compared with cottonseed oil mayonnaise as shown in the following table:

*In air at 23°–27° F.—hours to break-point*

| | Hours |
|---|---|
| Mayonnaise made with cottonseed oil | 10 |
| Mayonnaise made with cottonseed oil plus soya salad oil of Example 1 (equal parts) | 68 |
| Mayonnaise made with 100% soya salad oil of Example 1 | 92–188 |

The resistance to emulsion failure is determined by subjecting a plurality of samples of the mayonnaise under test to a temperature of 23°–27° F., withdrawing one of the samples at intervals from this low temperature, raising the withdrawn sample to room temperature and observing whether a definite break between the oleaginous and aqueous component occurs. The minimum time required to effect such a break is the value appearing in the above table.

EXAMPLE 2

Example 1 was repeated except that the oil was hydrogenated at 220°–225° F. to an iodine value of 114.0. The oil was cooled to 45° F., over a period of 48 hours and after permitting the oil to remain at 45° F. for an additional 24 hours, the crystallized components were separated therefrom. This oil yielded 9.6% of stearine of melting point 112.8° and iodine value 88.3. The filtrate was deodorized at 440° F. The oil was found to have a cold test of 5 hours and contained no conjugated dienoic acid components, 0.004% of conjugated trienoic acid components and no conjugated tetraenoic acid components. The total dienoic, trienoic and tetraenoic acid components, whether conjugated or non-conjugated, in the oil were respectively, 39.2%, 3.4% 0.01%. Mayonnaise containing equal parts of cottonseed oil mixed with the oil of Example 2 was of superior quality and stability.

EXAMPLE 3

Example 1 was repeated except that the catalyst used was that described in U. S. Patent 2,320,063, the temperature of hydrogenation 195°–205° F. and the oil was hydrogenated to an iodine value of 115.0. The refined soya bean oil used in this example had an iodine value of 136.3. Crystallization was accomplished by cooling the hydrogenated oil to 45° F. over a period of 3 days. It was held for another day after which it was filtered. The filtered oil, having an iodine value of 117.2, was deodorized at 440° F. The deodorized oil had a cold test value of 18 hours. When mixed with a cottonseed salad oil having a 20-hour cold test value, the cold test value of the resulting mixture was 36 hours.

The oil contained no conjugated dienoic, trienoic or tetraenoic acid components. The glycerides of this soya salad oil contained no tetraenoic, 3.7% trienoic and 38.8% dienoic acids.

Mayonnaise prepared from the hydrogenated and deodorized soya bean oil of this example mixed with an equal amount of cottonseed oil having a cold test value of 20 hours did not manifest oil separation after being held at 25° F. for more than 7 days. Furthermore, at 15° F., this mayonnaise was stable for more than 96 hours, whereas mayonnaise made from a corn oil having a cold test of 60 hours was completely broken after less than 64 hours at 15° F.

The soya bean oil of this example may be used as a liquid salad oil. It may also be mixed with other vegetable oils, such as cottonseed, corn, sesame or peanut oils for this purpose. For example, an excellent liquid salad oil is produced by mixing 90 parts by weight of the soya bean oil of this example with 10 parts by weight of sesame oil.

While the soya bean oil of this invention has been described with particular reference to its use in mayonnaise, that description is illustrative and is not to be construed as a limitation of the invention, since such soya bean oil may be used for numerous other purposes, such as a component in other salad dressings or the liquid fraction of a compounded shortening or margarine oil or wherever a liquid vegetable oil of good stability is required. It may, of course, be mixed with other vegetable oils in any proportions for any required purpose.

The mixtures of hydrogenated, winterized soya bean oils with winterized vegetable oils and mayonnaise containing said oil mixtures which are disclosed in the present application are the subject matter of the copending application of D. Melnick, C. M. Gooding, and H. W. Vahlteich, Serial No. 268,935, filed January 29, 1952.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A hydrogenated and winterized soya bean oil for use as a salad oil having an iodine number of 100 to 120 and containing less than 1% of conjugated dienoic acid components, less than 0.02% of conjugated trienoic acid components and less than 0.002% of conjugated tetraenoic acid components.

2. A hydrogenated and winterized soya bean oil for use as a salad oil having an iodine number of 110 to 120 and containing less than 0.8% of conjugated dienoic acid components, less than 0.015% of conjugated dienoic acid components and less than 0.002% of conjugated tetraenoic acid components.

3. A hydrogenated and winterized soya bean oil for use as a salad oil having an iodine number of 100 to 120 and containing less than 0.01% of conjugated trienoic acid components and substantially no conjugated dienoic acid and tetraenoic acid components.

4. A hydrogenated and winterized soya bean oil for use as a salad oil having an iodine number of 110 to 120 and containing substantially no conjugated dienoic, trienoic and tetraenoic acid components.

5. A mayonnaise comprising vinegar, eggs, salt and a hydrogenated and winterized soya bean oil having an iodine number of 100 to 120 and containing less than 1% of conjugated dienoic acid components, less than 0.02% of conjugated trienoic acid components and less than 0.002% of conjugated tetraenoic acid components.

6. A mayonnaise comprising vinegar, eggs, salt, and a hydrogenated and winterized soya bean oil having an iodine number of 110 to 120 and containing less than 0.8% of conjugated dienoic acid components, less than 0.015% of conjugated trienoic acid components, and less than 0.002% of conjugated tetraenoic acid components.

7. A mayonnaise comprising vinegar, eggs, salt and a hydrogenated and winterized soya bean oil having an iodine number of 100 to 120 and containing less than 0.01% of conjugated trienoic acid components, substantially no conjugated dienoic acid and tetraenoic acid components.

8. A mayonnaise comprising vinegar, eggs, salt, and a hydrogenated and winterized soya bean oil having an iodine number of 110 to 120 and containing substantially no conjugated dienoic, trienoic, and tetraenoic acid components.

9. The method of producing an improved hydrogenated soya bean oil suitable for use as a salad oil comprising hydrogenating at a temperature of less than 245° F. a refined soya bean oil to an iodine number of 100 to 120, cooling the resulting hydrogenated oil and separating the solid components therefrom.

10. The method of producing an improved hydrogenated soya bean oil suitable for use as a salad oil comprising hydrogenating at a temperature of less than 225° F. a refined soya bean oil to an iodine number of 100 to 120, cooling the resulting hydrogenated oil and separating the solid components therefrom.

11. The method of producing an improved hydrogenated soya bean oil suitable for use as a salad oil comprising hydrogenating at a temperature of less than 245° F. a refined soya bean oil to an iodine number of 110 to 120, cooling the resulting hydrogenated oil and separating the solid components therefrom.

12. The method of producing an improved hydrogenated soya bean oil suitable for use as a salad oil comprising hydrogenating a refined soya bean oil to an iodine number of 110 to 120 at a temperature of less than 225° F., cooling the resulting hydrogenated oil and separating the solid components therefrom.

13. The method of producing an improved hydrogenated soya bean oil suitable for use as a salad oil comprising hydrogenating at a temperature of 195° to 220° F. a refined soya bean oil to an iodine number of 100 to 120, cooling the resulting hydrogenated oil to 40° to 47° F. and separating the solid components therefrom.

14. The method of producing an improved hydrogenated soya bean oil suitable for use as a salad oil comprising hydrogenating at a temperature of 195° to 220° F. a refined soya bean oil to an iodine number of 110 to 120, cooling the resulting hydrogenated oil to 40° to 47° F. and separating the solid components therefrom.

CHESTER M. GOODING.

REFERENCES CITED

The following references are of record in the file of this patent:

UNITED STATES PATENTS

| Number | Name | Date |
|---|---|---|
| 2,136,653 | Moore et al. | Nov. 15, 1938 |
| 2,293,729 | Gudheim | Aug. 25, 1942 |
| 2,353,229 | Durkee | July 11, 1944 |